United States Patent
Zhao et al.

(10) Patent No.: US 12,108,431 B2
(45) Date of Patent: Oct. 1, 2024

(54) METHOD, APPARATUS, DEVICE, AND SYSTEM FOR DETERMINING SIDELINK FEEDBACK CHANNEL, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 352 days.

(21) Appl. No.: 17/562,750

(22) Filed: Dec. 27, 2021

(65) Prior Publication Data

US 2022/0124726 A1 Apr. 21, 2022

Related U.S. Application Data

(63) Continuation of application No. PCT/CN2019/094930, filed on Jul. 5, 2019.

(51) Int. Cl.
*H04W 72/542* (2023.01)
*H04W 72/02* (2009.01)
*H04W 72/0446* (2023.01)
*H04W 72/0453* (2023.01)
*H04W 72/20* (2023.01)

(52) U.S. Cl.
CPC ......... *H04W 72/542* (2023.01); *H04W 72/02* (2013.01); *H04W 72/0446* (2013.01); *H04W 72/0453* (2013.01); *H04W 72/20* (2023.01)

(58) Field of Classification Search
CPC .............. H04W 72/542; H04W 72/02; H04W 72/0446; H04W 72/0453; H04W 72/20; H04W 72/40; H04L 1/0017; H04L 1/1861; H04L 5/0055; H04L 1/1896
See application file for complete search history.

(56) References Cited

U.S. PATENT DOCUMENTS

2018/0359714 A1 12/2018 Sadiq et al.
2020/0336253 A1* 10/2020 He .................. H04W 76/11
(Continued)

FOREIGN PATENT DOCUMENTS

CN 108400843 A 8/2018
CN 109891981 A 6/2019

OTHER PUBLICATIONS

International Search Report and Written Opinion dated Apr. 2, 2020 in International Application No. PCT/CN2019/094930. English translation attached.
(Continued)

*Primary Examiner* — Mohamed A Kamara
(74) *Attorney, Agent, or Firm* — Sheppard, Mullin, Richter & Hampton LLP

(57) ABSTRACT

Embodiments of the present disclosure provide a method for determining a sidelink feedback channel, which is applied in the field of communication technologies. The method includes: receiving first sidelink data; and determining, based on a feedback channel format indicator, a target sidelink feedback channel format for transmitting feedback information for the first sidelink data.

19 Claims, 7 Drawing Sheets

(56) References Cited

U.S. PATENT DOCUMENTS

| | | | |
|---|---|---|---|
| 2022/0085923 A1* | 3/2022 | Ye | H04L 1/1825 |
| 2022/0104238 A1* | 3/2022 | Aiba | H04L 5/0053 |
| 2022/0116934 A1* | 4/2022 | Zhang | H04L 1/1861 |
| 2023/0074337 A1* | 3/2023 | Cheng | H04L 5/0033 |

OTHER PUBLICATIONS

NTT Docomo, Inc. 3GPP TSG RAN WG1 #96 R1-1902798, "Sidelink Physical Layer Structure for NR V2X", Mar. 1, 2019 (Mar. 1, 2019), Section 2, 8 pages.

* cited by examiner

METHOD, APPARATUS, DEVICE, AND SYSTEM FOR DETERMINING SIDELINK FEEDBACK CHANNEL, AND STORAGE MEDIUM

CROSS-REFERENCE TO RELATED APPLICATION

The present application is a continuation of International Application No. PCT/CN2019/094930, filed on Jul. 5, 2019, the entire contents of which are incorporated herein by reference.

TECHNICAL FIELD

The present disclosure relates to the field of Device to Device (D2D) communication technologies, and more particularly, to a method, an apparatus, a device, and a system for determining a sidelink feedback channel, and a storage medium.

BACKGROUND

In D2D communications, data communication can be performed directly between a transmitting device and a receiving device via a dedicated air interface, without having to be relayed by an access network device (such as a base station). In an implementation, the access network device can perform resource configuration, scheduling, coordination, etc., thereby assisting direct communication between the transmitting device and the receiving device.

At present, in order to improve transmission reliability, a sidelink feedback channel is introduced on a side link. After receiving sidelink data from the transmitting device, the receiving device needs to transmit feedback information for the sidelink data to the transmitting device through the sidelink feedback channel. To that end, two sidelink feedback channel formats are introduced, i.e., a first sidelink feedback channel format and a second sidelink feedback channel format. The first format of sidelink feedback channel only occupies one or two time domain symbols, and the second format of sidelink feedback channel occupies all time domain symbols in a slot that are usable for the side link. Thus, it is necessary to determine which sidelink feedback channel format is used to transmit the feedback information.

SUMMARY

Embodiments of the present disclosure provide a method, an apparatus, a device, and a system for determining a sidelink feedback channel, and a storage medium, which are capable of determining a sidelink feedback channel format for transmitting feedback information.

In one aspect, a method for determining a sidelink feedback channel is provided. The method is applied in a receiving device. The method includes: receiving first sidelink data; and determining, based on a feedback channel format indicator, a target sidelink feedback channel format for transmitting feedback information for the first sidelink data.

In another aspect, a method for determining a sidelink feedback channel is provided. The method is applied in a transmitting device. The method includes: determining a target sidelink feedback channel format for transmitting feedback information for first sidelink data; and transmitting the first sidelink data, and indicating the target sidelink feedback channel format.

In another aspect, a receiving device is provided. The receiving device includes a processor and a memory. The memory has at least one instruction stored thereon. The at least one instruction is executed by the processor to implement any method according to the one aspect.

BRIEF DESCRIPTION OF DRAWINGS

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

In order to make the objects, technical solutions, and advantages of the present disclosure more apparent, embodiments of the present disclosure will be described in detail below with reference to the accompanying drawings.

Before describing a method for determining a sidelink feedback channel according to embodiments of the present disclosure in detail, application scenarios and implementation environments involved in the embodiments of the present disclosure will be briefly introduced.

First, the application scenarios involved in the embodiments of the present disclosure are briefly introduced.

One of the application scenarios of the D2D sidelink transmission technology is the Internet of vehicles system. Unlike a conventional Long Term Evolution (LTE) system in which data is received or transmitted through a base station, devices in the Internet of vehicles system directly perform data communication with each other, thereby achieving higher spectrum efficiency and a shorter transmission delay.

Figure 1:
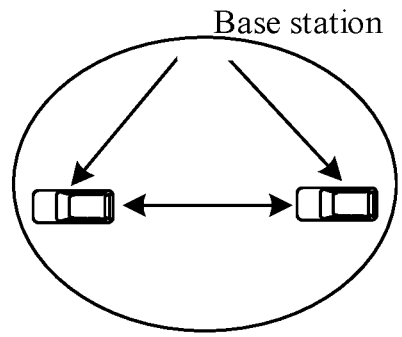
FIG. 1 is a schematic diagram showing an implementation scenario according to an exemplary embodiment.
Figure 2:
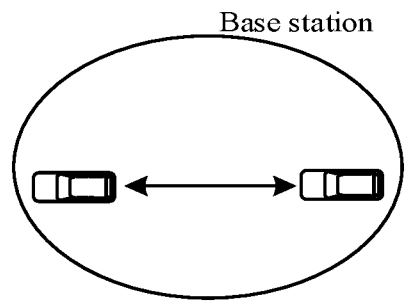
FIG. 2 is a schematic diagram showing an implementation scenario according to another exemplary embodiment.

At present, a number of transmission modes have been introduced to the Internet of vehicles system, including mode A and mode B. Mode A means that transmission resources of a device are allocated by the base station. As illustrated in FIG. 1, the device transmits data on a side link based on the resources allocated by the base station. Further, the base station can allocate resources for a single transmission to the device, or can allocate semi-static resources to the device. Mode B means that the device selects a resource from a resource pool for data transmission. As illustrated in FIG. 2, in an implementation, the device can select a transmission resource from the resource pool by sensing, or select the transmission resource from the resource pool by random selection.

Figure 3:
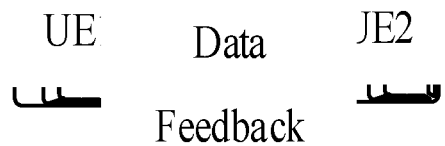
FIG. 3 is a schematic diagram showing an implementation environment according to an exemplary embodiment.

The following description takes New Radio (NR)-Vehicle to Everything (V2X) as an example. In order to improve transmission reliability, a sidelink feedback channel is introduced to the side link. In this way, after a receiving device receives sidelink data from a transmitting device, the receiving device can transmit feedback information for the sidelink data through the sidelink feedback channel. For example, as illustrated in FIG. 3, User Equipment (UE) 1 and UE2 form a unicast link. UE1 transmits the sidelink data to UE2. UE2 transmits the feedback information to UE1 through the sidelink feedback channel based on a detection result of the received sidelink data. The feedback information may be Hybrid Automatic Repeat ReQuest (HARQ) Acknowledgement (ACK) or HARQ Negative Acknowledgement (NACK). UE1 receives the feedback information of UE2, and determines whether to retransmit the sidelink data to UE2 based on the feedback information.

In addition, two sidelink feedback channel formats are introduced in the NR-V2X service scenario.

The first sidelink feedback channel format can also be referred to as a short feedback channel. If such a short feedback channel does not include symbols used for Automatic Gain Control (AGC), such a format of sidelink feedback channel usually only occupies one or two Orthogonal Frequency Division Multiplexing (OFDM) symbols in one slot. Further, since the last symbol of a slot may also be used for a Guard Period (GP), the sidelink feedback channel may also usually occupy the last but one time domain symbol of a slot, or occupy the last but one and the last but two time domain symbols of the slot. If this short feedback channel includes symbols used for the AGC, this format of sidelink feedback channel usually only occupies two or three OFDM symbols in one slot. Further, since the last symbol of a slot may also be used for the GP, the sidelink feedback channel may also usually occupy the last but one and the last but two time domain symbols of a slot, with the last but two time domain symbol being an AGC symbol, or occupy the last but one to the last but three time domain symbols of a slot, with the last but three time domain symbol being an AGC symbol. Advantages of this sidelink feedback channel format are a low time delay enabling quick transmission of the feedback information. However, since this format of sidelink feedback channel only occupies one or two time domain symbols, it has low signal energy and a small transmission range.

Figure 4:
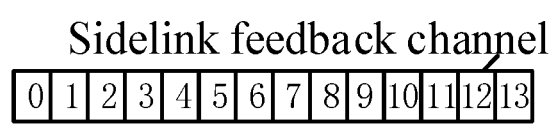
FIG. 4 is a schematic diagram showing a first sidelink feedback channel format in a time domain according to an exemplary embodiment.

FIG. 4 is a schematic diagram showing a first sidelink feedback channel format according to an exemplary embodiment. Referring to FIG. 4, the sidelink feedback channel occupies the last but one time domain symbol (time domain symbol numbered 12), and the last time domain symbol is the GP. Further, the last but two symbol can be the AGC symbol. Optionally, the AGC symbol and the second symbol of the sidelink feedback channel can repeatedly transmit the same information.

The second sidelink feedback channel format can also be referred to as a long feedback channel. This format of sidelink feedback channel occupies all time domain symbols in a slot that can be used for sidelink transmission. By way of example, the last time domain symbol in a slot is used for the GP, and other time domain symbols can be used for the sidelink transmission. Then, the sidelink feedback channel occupies all time domain symbols in the slot except the last time domain symbol. The first time domain symbol is usually used for the AGC symbol, and the sidelink feedback information or randomly generated padding bits may be mapped on the AGC symbol. Advantages of this sidelink feedback channel format are high feedback information energy, high detection performance, and a large transmission range.

Figure 5:
FIG. 5 is a schematic diagram showing a second sidelink feedback channel format in a time domain according to an exemplary embodiment.

FIG. 5 is a schematic diagram showing a second sidelink feedback channel format according to an exemplary embodiment. Referring to FIG. 5, the last time domain symbol of a slot is used as the GP symbol, and no data is mapped on this symbol. Remaining time domain symbols in the slot are used to transmit the sidelink feedback channel. The first symbol can be used for the AGC, and the feedback information can be mapped on the first symbol.

In view of this, during data transmission, it is necessary to determine which sidelink feedback channel format may be adopted to transmit the feedback information. To this end, an embodiment of the present disclosure provides the method for determining the sidelink feedback channel, which can be applied to any D2D system. For the specific implementation of the method, reference can be made to the following embodiments.

The implementation environments involved in the embodiments of the present disclosure will be briefly described below.

Figure 6:
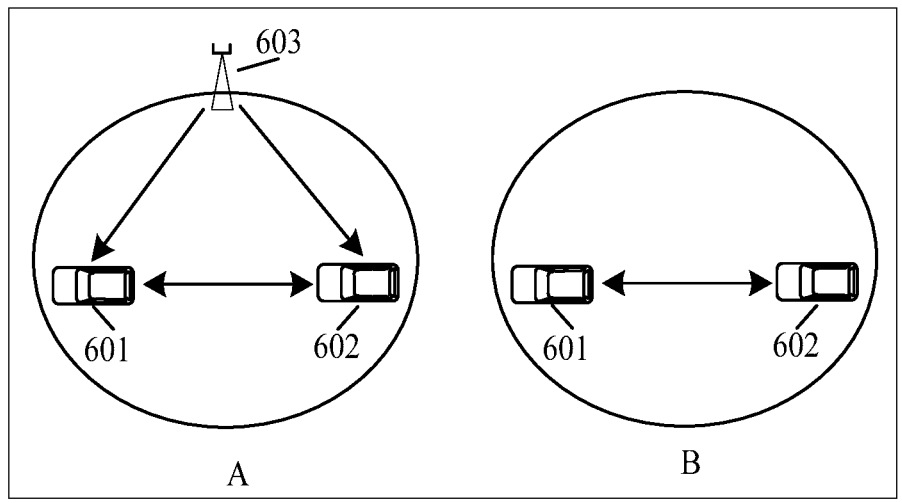
FIG. 6 is a schematic diagram showing two implementation environments according to an exemplary embodiment.

FIG. 6 is a schematic diagram showing two implementation environments according to an exemplary embodiment. Referring to FIG. 6, an implementation scenario A includes a transmitting device 601, a receiving device 602, and an access network device (such as a base station) 603. The transmitting device 601 and the receiving device 602 may directly perform data communication through a side link. That is, there is no need for the access network device 603 to forward data between the transmitting device 601 and the receiving device 602. In addition, the access network device 603 can perform resource configuration, scheduling, coordination, etc., to assist the transmitting device 601 and the receiving device 602 in achieving direct communication. An implementation scenario B includes the transmitting device 601 and the receiving device 602, and includes no access network device. The transmitting device 601 and the receiving device 602 can directly perform the data communication through the side link. A resource pool for the sidelink transmission may be configured in a pre-configured manner. The transmitting device 601 and the receiving device 602 may use transmission resources in the pre-configured resource pool for the data communication.

As an example, both the transmitting device 601 and the receiving device 602 may be in-vehicle devices.

After the introduction of the application scenarios and implementation environments involved in the embodiments of the present disclosure, the method for determining the sidelink feedback channel according to the embodiments of the present disclosure will be described in detail below in conjunction with the accompanying drawings.

Figure 7:
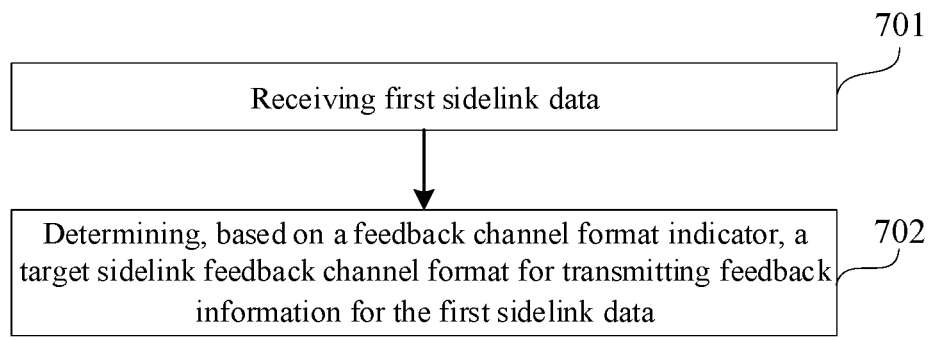
FIG. 7 is a flowchart illustrating a method for determining a sidelink feedback channel according to an exemplary embodiment of the present disclosure.

FIG. 7 is a flowchart illustrating a method for determining a sidelink feedback channel according to an exemplary embodiment. Referring to FIG. 7, the method can be applied to each of the implementation environments illustrated in FIG. 6, and can be implemented by the receiving device serving as a main execution body. The method can include the following implementation operations.

In block 701, first sidelink data is received.

In an embodiment, the transmitting device may transmit the first sidelink data to the receiving device through the side link in the above mode A or mode B.

In block 702, a target sidelink feedback channel format for transmitting feedback information for the first sidelink data is determined based on a feedback channel format indicator.

The receiving device receives the first sidelink data, and determines the feedback information for the first sidelink data based on a detection result of the first sidelink data. For example, when the receiving device successfully receives Sidelink Control Information (SCI) corresponding to the first sidelink data and successfully receives the first sidelink data, the feedback information can be determined to be the ACK. When the receiving device successfully receives the SCI corresponding to the first sidelink data, but fails to receive the first sidelink data, it can be determined that the feedback information is the NACK. Further, when the receiving device fails to receive the SCI corresponding to the first sidelink data, the feedback information is not transmitted.

In addition, the receiving device determines, based on the feedback channel format indicator, the target sidelink feedback channel format for transmitting the feedback information for the first sidelink data. In an embodiment, different feedback channel format indicators can be used to determine the target sidelink feedback channel format.

Further, when it is determined that the target sidelink feedback channel format is the first sidelink feedback channel format described above, the receiving device transmits the feedback information to the transmitting device through the first sidelink feedback channel format. Or, when it is determined that the target sidelink feedback channel format is the second sidelink feedback channel format described above, the receiving device transmits the feedback information to the transmitting device through the second sidelink feedback channel format.

In this embodiment of the present disclosure, the receiving device is configured to receive the first sidelink data, and determine, based on the feedback channel format indicator, the target sidelink feedback channel format for transmitting the feedback information for the first sidelink data. In this way, the receiving device can transmit the feedback information through the determined target sidelink feedback channel.

As described above, different feedback channel format indicators can be used to determine the target sidelink feedback channel format. In the following, specific implementations of determining the target sidelink feedback channel format based on different feedback channel format indicators will be described below through the following embodiments.

Figure 8:
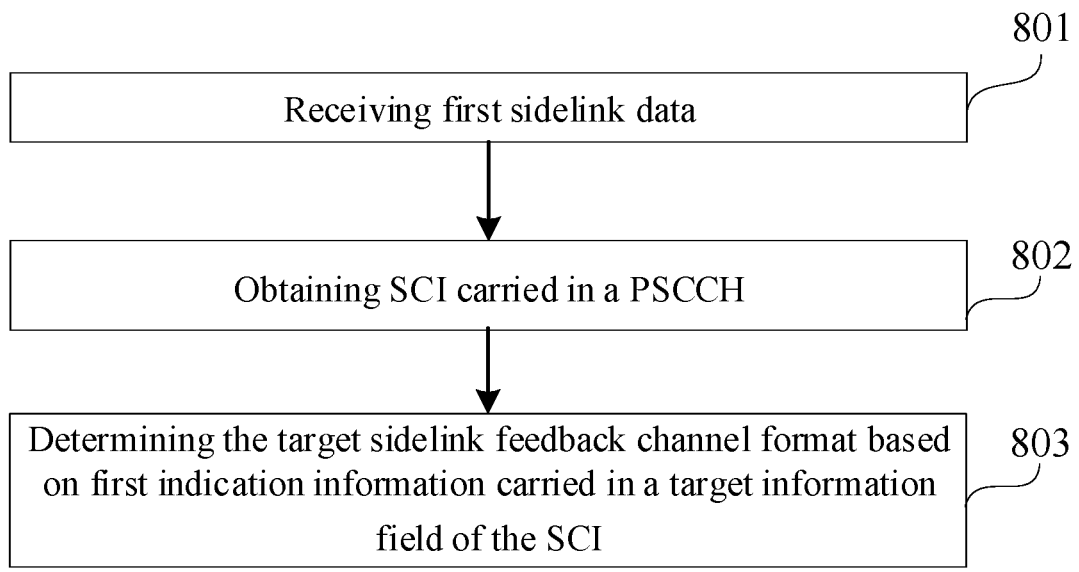
FIG. 8 is a flowchart illustrating a method for determining a sidelink feedback channel according to another exemplary embodiment of the present disclosure.

FIG. 8 is a flowchart illustrating a method for determining a sidelink feedback channel according to another exemplary embodiment. The method can be applied in each of the implementation environments illustrated in FIG. 6. The method may include the following implementation operations.

In block 801, first sidelink data is received.

For a specific implementation of the operation at block 801, reference may be made to block 701 in the embodiment of FIG. 7 described above.

In block 802, SCI carried in a Physical Sidelink Control Channel (PSCCH) is obtained.

It should be understood that in a data scheduling process, the transmitting device may transmit a Physical Sidelink Shared Channel (PSSCH) and a PSCCH related to the PSSCH to the receiving device. That is, the transmitting device may transmit the PSSCH and the PSCCH. The PSCCH is used to carry the SCI, and the SCI is used to indicate transmission resources and parameters of the PSSCH.

As an example, a target information field for indicating the sidelink feedback channel format may be included in the SCI. In this way, the transmitting device may carry the first indicator in the target information field for indicating the sidelink feedback channel format. That is, the transmitting device can indicate for the receiving device which sidelink feedback channel format to use to transmit the feedback information for the first sidelink data, and the indication may be performed through the target information field in the SCI. In this case, the receiving device obtains the SCI carried in the PSCCH.

In block 803, the target sidelink feedback channel format is determined based on first indicator carried in a target information field of the SCI.

The receiving device obtains the first indicator from the target information field of the SCI, thereby determining the target sidelink feedback channel format based on the first indicator, i.e., determining which sidelink feedback channel format is used for transmitting the feedback information for the first sidelink data.

The first indicator may be a bit value. For example, when the first indicator is "0", the receiving device determines that the target sidelink feedback channel format is the first sidelink feedback channel format. When the first indicator is "1", the receiving device determines that the target sidelink feedback channel format is the second sidelink feedback channel format.

In this embodiment of the present disclosure, the first sidelink data is received. The SCI carried in the PSCCH is obtained. The target sidelink feedback channel format is determined based on the first indicator carried in the target information field of the SCI. That is, the first indicator may be carried by the target information field of the SCI, such that the receiving device may determine, based on the first indicator, which sidelink feedback channel format is used to transmit the feedback information.

Figure 9:
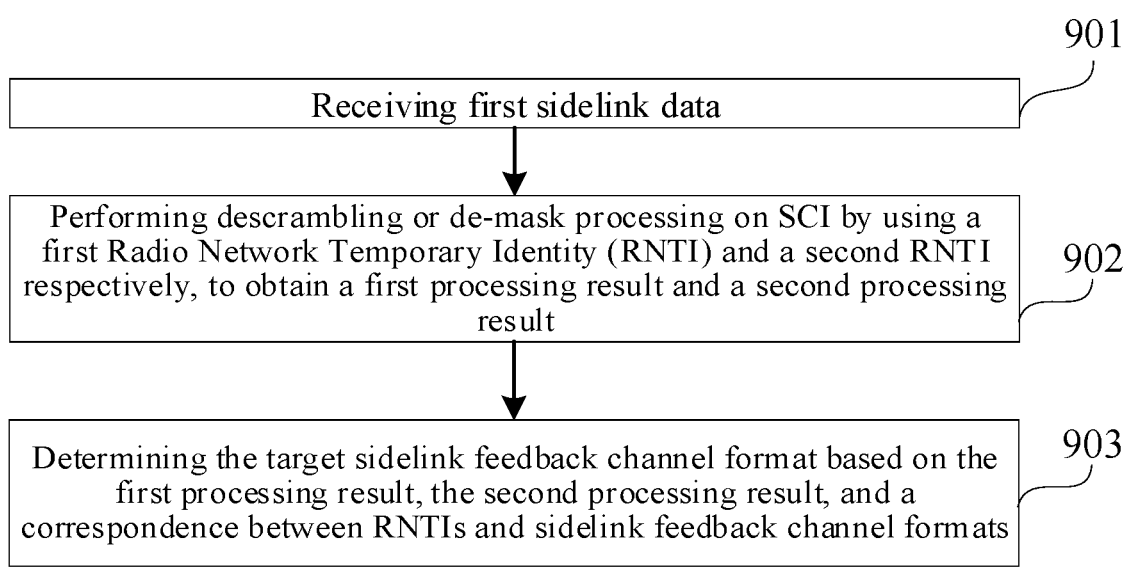
FIG. 9 is a flowchart illustrating a method for determining a sidelink feedback channel according to yet another exemplary embodiment of the present disclosure.

FIG. 9 is a flowchart illustrating a method for determining a sidelink feedback channel according to yet another exemplary embodiment of the present disclosure. Referring to FIG. 9, the method can be applied to each of the implementation environments illustrated in FIG. 6, and can be implemented by the receiving device serving as the main execution body. The method can include the following implementation operations.

In block 901, first sidelink data is received.

For a specific implementation of the operation at block 901, reference may be made to block 701 in the embodiment of FIG. 7 described above.

In block 902, descrambling or de-mask processing is performed on SCI by using a first Radio Network Temporary Identity (RNTI) and a second RNTI respectively, to obtain a first processing result and a second processing result.

As an example, the transmitting device may give an indication to the receiving device on which sidelink feedback channel format to use to transmit the feedback information for the first sidelink data. Further, the transmitting device may give the indication by using different RNTIs. Specifically, the transmitting device can generate a scrambling sequence based on an RNTI corresponding to the sidelink feedback channel to be actually used, perform scrambling or mask processing on the SCI by using the generated scrambling sequence, and transmit the SCI to the receiving device, so as to give an indication to the receiving device on the sidelink feedback channel format to be used.

By way of example, if the transmitting device determines to use the first sidelink feedback channel format, the transmitting device can generate the scrambling sequence based on the first RNTI, and perform the scrambling or mask processing on the SCI by using the generated scrambling sequence. If the transmitting device determines to use the second sidelink feedback channel format, the transmitting device can generate the scrambling sequence based on the second RNTI, and perform the scrambling or mask processing on the SCI by using the generated scrambling sequence.

For the receiving device, descrambling or de-mask processing can be performed on the SCI by using different RNTIs to obtain different processing results. In an implementation, the receiving device may generate the scrambling sequence based on the first RNTI, and perform the descrambling or de-mask processing on the SCI by using the generated scrambling sequence to obtain the first processing result. In addition, the receiving device may generate the scrambling sequence based on the second RNTI, and perform the descrambling or de-mask processing on the SCI by using the generated scrambling sequence to obtain the second processing result.

In block 903, the target sidelink feedback channel format is determined based on the first processing result, the second processing result, and a correspondence between RNTIs and sidelink feedback channel formats.

The correspondence between the RNTIs and the sidelink feedback channel formats can be pre-configured or configured by a network. That is, a correspondence between the first RNTI and the second RNTI and the first sidelink feedback channel format and the second sidelink feedback channel format can be pre-configured or configured by the network.

The receiving device may perform Cyclic Redundancy Check (CRC) processing on the first processing result and the second processing result respectively, so as to determine whether the transmitting device has used the first RNTI or the second RNTI. Specifically, if the check of the first processing result is correct, it can be determined that the transmitting device has used the first RNTI. If the check of the second processing result is correct, it can be determined that the transmitting device has used the second RNTI.

After the RNTI used by the transmitting device is determined, the target sidelink feedback channel format is determined based on the correspondence between the RNTIs and the sidelink feedback channel formats. With continued reference to the above example, when the receiving device determines that the transmitting device has used the first RNTI, it can be determined based on the correspondence between the RNTIs and the sidelink feedback channel formats that the target sidelink feedback channel format is the first sidelink feedback channel format. When the receiving device determines that the transmitting device has used the second RNTI, it can be determined based on the correspondence between the RNTIs and the sidelink feedback channel formats that the target sidelink feedback channel format is the second sidelink feedback channel format.

In this embodiment of the present disclosure, the receiving device is configured to receive the first sidelink data, perform the descrambling or de-mask processing on the SCI by using different RNTIs to obtain the first processing result and the second processing result, and determine the target sidelink feedback channel format based on the first processing result, the second processing result, and the correspondence between the RNTIs and the sidelink feedback channel formats. In this way, the existing SCI format can be used to realize the determination of the sidelink feedback channel without adding an additional information field, thereby avoiding increasing a number of information bits of the SCI.

Figure 10:
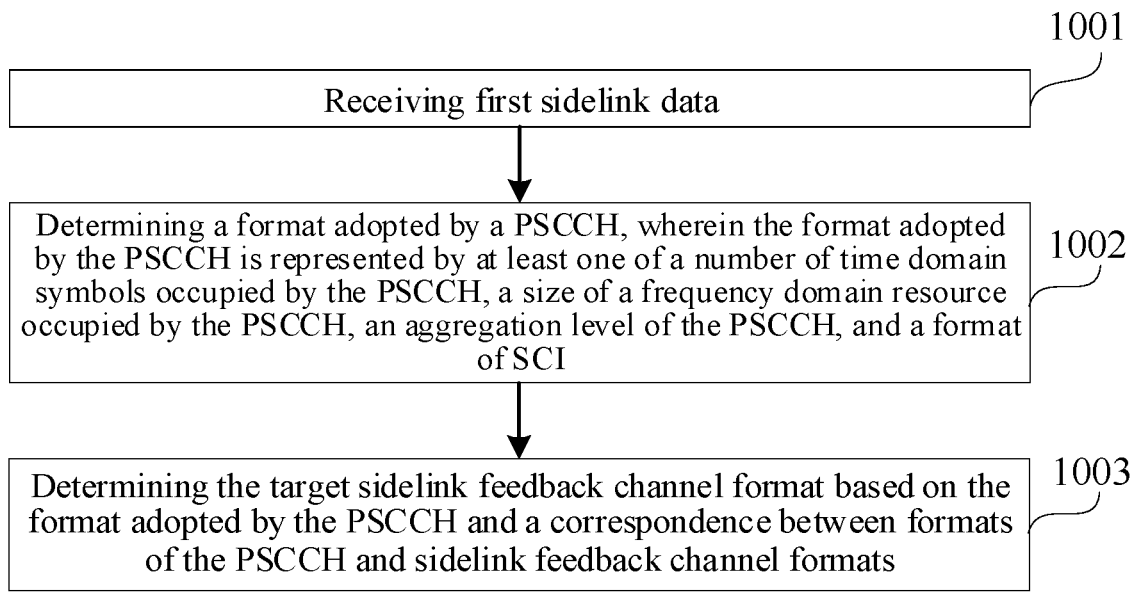
FIG. 10 is a flowchart illustrating a method for determining a sidelink feedback channel according to still yet another exemplary embodiment of the present disclosure.

FIG. 10 is a flowchart illustrating a method for determining a sidelink feedback channel according to still yet another exemplary embodiment. Referring to FIG. 10, the method can be applied to each of the implementation environments illustrated in FIG. 6, and can be implemented by the receiving device serving as the main execution body. The method can include the following implementation operations.

In block 1001, first sidelink data is received.

For a specific implementation of the operation at block 1001, reference may be made to block 701 in the embodiment of FIG. 7 described above.

In block 1002, a format adopted by a PSCCH is determined. The format adopted by the PSCCH is represented by at least one of a number of time domain symbols occupied by the PSCCH, a size of a frequency domain resource occupied by the PSCCH, an aggregation level of the PSCCH, and a format of SCI.

An aggregation level of the PSCCH corresponds to a size of the transmission resource. Different aggregation levels of the PSCCH can correspond to different sizes of the transmission resource.

As an example, the transmitting device may give an indication to the receiving device on which sidelink feedback channel format to use to transmit the feedback information for the first sidelink data. Further, the first sidelink data may be transmitted through different formats of the PSCCH, such that the sidelink feedback channel formats can be indicated through different formats of the PSCCH. That is, after the transmitting device determines the target sidelink feedback channel format, a corresponding format of the PSCCH can be used for data transmission.

For the receiving device, the format adopted by the PSCCH is determined. In an implementation, the receiving device may determine the currently adopted format of the PSCCH based on at least one of the number of time domain symbols occupied by the PSCCH, the size of the frequency domain resource occupied by the PSCCH, the aggregation level of the PSCCH, and the format of SCI.

In block 1003, the target sidelink feedback channel format is determined based on the format adopted by the PSCCH and a correspondence between formats of the PSCCH and sidelink feedback channel formats.

The correspondence between the formats of the PSCCH and the sidelink feedback channel formats may be pre-configured, or may also be configured by the network, and this is not limited by embodiments of the present disclosure.

By way of example, when it is determined that the PSCCH adopts a first format, and it is determined based on the correspondence between the formats of the PSCCH and the sidelink feedback channel formats that the first PSCCH format corresponds to the first sidelink feedback channel format, it can be determined that the target sidelink feedback channel format is the first sidelink feedback channel format. When it is determined that the PSCCH adopts a second format, and it is determined based on the correspondence between the formats of the PSCCH and the sidelink feedback channel formats that the second PSCCH format corresponds to the second sidelink feedback channel format, it can be determined that the target sidelink feedback channel format is the second sidelink feedback channel format.

In this embodiment of the present disclosure, the receiving device is configured to receive the first sidelink data, and determine the target sidelink feedback channel format based on the current format of the PSCCH and the correspondence between the formats of the PSCCH and the sidelink feedback channel formats. That is, the sidelink feedback channel format can be indicated through the format of the PSCCH.

Figure 11:
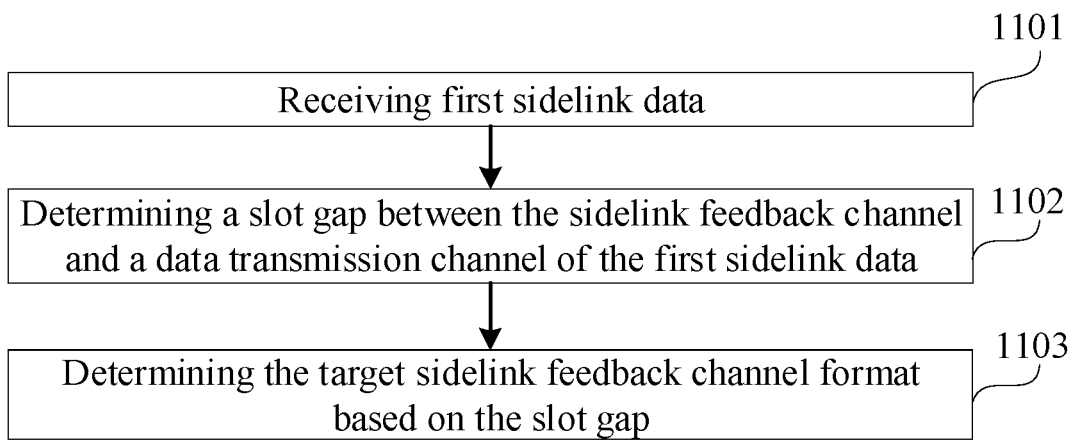
FIG. 11 is a flowchart illustrating a method for determining a sidelink feedback channel according to still yet another exemplary embodiment of the present disclosure.

FIG. 11 is a flowchart illustrating a method for determining a sidelink feedback channel according to still yet another exemplary embodiment. Referring to FIG. 11, the method can be applied to each of the implementation environments illustrated in FIG. 6, and can be implemented by the receiving device serving as the main execution body. The method can include the following implementation operations.

In block 1101, first sidelink data is received.

For a specific implementation of the operation at block 1101, reference may be made to block 701 in the embodiment of FIG. 7 described above.

In block 1102, a slot gap between the sidelink feedback channel and a data transmission channel of the first sidelink data is determined.

As an example, the transmitting device may give an indication to the receiving device on which sidelink feedback channel format to use to transmit the feedback information for the first sidelink data. Further, the transmitting device may indicate the sidelink feedback channel format through the slot gap between the sidelink feedback channel and the data transmission channel of the first sidelink data. That is, the transmitting device determines the slot gap based on the sidelink feedback channel format to be actually used, and performs data transmission based on the slot gap.

In block 1103, the target sidelink feedback channel format is determined based on the slot gap.

As an example, determining the target sidelink feedback channel format based on the slot gap includes: determining the target sidelink feedback channel format as a first sidelink feedback channel format when the slot gap is smaller than a slot threshold; and determining the target sidelink feedback channel format as a second sidelink feedback channel format when the slot gap is larger than or equal to the slot threshold. A number of time domain symbols occupied by the first sidelink feedback channel format is smaller than a number of time domain symbols occupied by the second sidelink feedback channel format.

Figure 12:
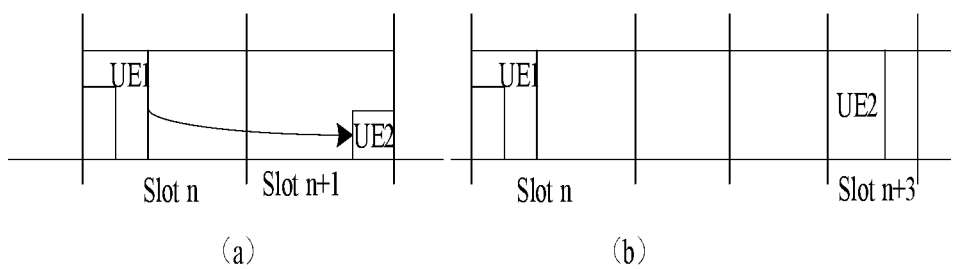
FIG. 12 is a schematic diagram showing a slot gap according to an exemplary embodiment.

The slot threshold may be a parameter configured by the network or pre-configured. For example, referring to FIG. 12, assuming that the slot threshold is K and K=2, when the slot gap between a slot where the sidelink feedback channel is located and a slot where the data transmission channel of the first sidelink data is located is smaller than two, the sidelink feedback channel format is used. That is, the target sidelink feedback channel format is determined to be the first sidelink feedback channel format (as illustrated in FIG. 12 (*a*)). When the slot gap between the slot where the sidelink feedback channel is located and the slot where the data transmission channel of the first sidelink data is located is larger than or equal to two, the second sidelink feedback channel format is used. That is, the target sidelink feedback channel format is the second sidelink feedback channel format (as illustrated in FIG. 12 (*b*)).

In this embodiment of the present disclosure, the first sidelink data is received, and the sidelink feedback channel format can be determined based on the slot gap between the sidelink feedback channel and the data transmission channel of the first sidelink data. That is, the sidelink feedback channel format for transmitting the feedback information for the first sidelink data is determined.

Figure 13:
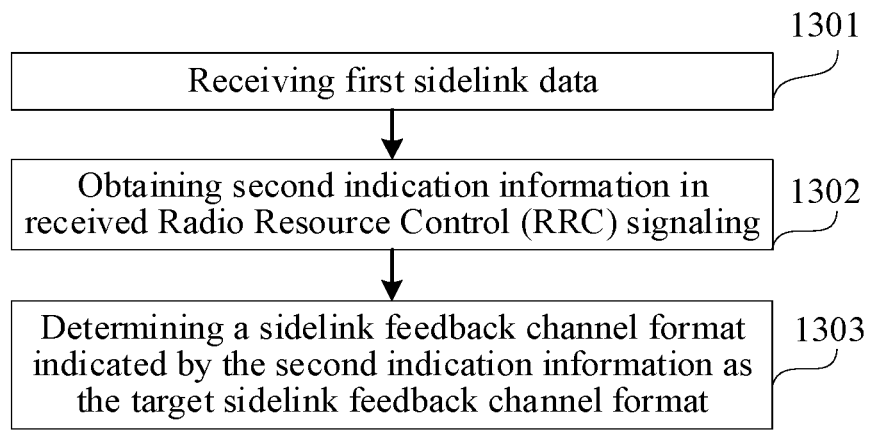
FIG. 13 is a flowchart illustrating a method for determining a sidelink feedback channel according to still yet another exemplary embodiment of the present disclosure.

FIG. 13 is a flowchart illustrating a method for determining a sidelink feedback channel according to still yet another exemplary embodiment. Referring to FIG. 13, the method can be applied to the implementation environment A illustrated in FIG. 6, and can be implemented by the receiving device serving as the main execution body. The method can include the following implementation operations.

In block 1301, first sidelink data is received.

For a specific implementation of the operation at block 1301, reference may be made to block 701 in the embodiment of FIG. 7 described above.

In block 1302, second indication information in received Radio Resource Control (RRC) signaling is obtained.

As an example, the access network device may indicate which sidelink feedback channel format to use to transmit the feedback information for the first sidelink data. Further, the access network device may carry the second indication information through the RRC signaling. The second indication information is used to indicate which sidelink feedback channel format is used to transmit the feedback information. In this case, the receiving device may obtain the second indication information from the network. Further, the receiving device may obtain the second indication information from the RRC signaling.

Although block 1301 is prior to block 1302 in the example illustrated in FIG. 13, block 1301 may also be subsequent to block 1302 in other examples.

Further, the RRC signaling is used to configure a PSSCH resource pool or a Physical Sidelink Feedback Channel (PSFCH) resource pool. In this case, the second indication information may be carried in configuration information of the PSSCH resource pool or the PSFCH resource pool.

As an example, when the receiving device detects the PSCCH in a certain resource pool, the receiving device can demodulate the PSSCH scheduled by the PSCCH to determine in which resource pool data is transmitted, thereby obtaining configuration information in the resource pool, and obtaining the second indication information from the configuration information.

In block 1303, a sidelink feedback channel format indicated by the second indication information is determined as the target sidelink feedback channel format.

For example, suppose that the second indication information is expressed in a form of a bit value. When the second indication information is "0", it can be determined that the target sidelink feedback channel format is the first sidelink feedback channel format. When the second indication information is "1", it can be determined that the target sidelink feedback channel format is the second sidelink feedback channel format.

In this embodiment of the present disclosure, the first sidelink data is received, and the second indication information is obtained from the RRC signaling, so as to determine the target sidelink feedback channel format based on the second indication information. That is, the network can indicate, through the RRC signaling, which target sidelink feedback channel format to use to transmit the feedback information for the first sidelink data, such that the receiving device can determine which target sidelink feedback channel format to use to transmit the feedback information. In this way, there is no need to provide an indication in the SCI, which reduces signaling overhead of the SCI.

Figure 14:
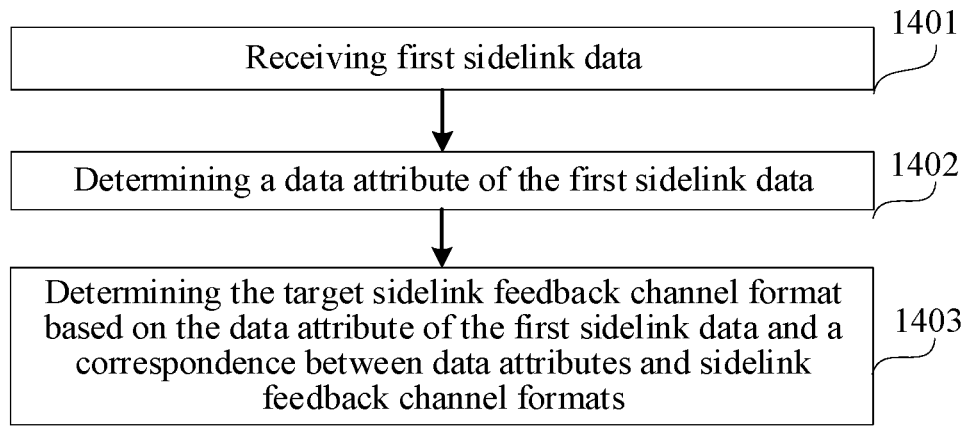
FIG. 14 is a flowchart illustrating a method for determining a sidelink feedback channel according to still yet another exemplary embodiment of the present disclosure.

FIG. 14 is a flowchart illustrating a method for determining a sidelink feedback channel according to an exemplary embodiment. Referring to FIG. 14, the method can be applied to each of the implementation environments illustrated in FIG. 6, and can be implemented by the receiving device serving as the main execution body. The method can include the following implementation operations.

In block 1401, first sidelink data is received.

For a specific implementation of the operation at block 1401, reference may be made to block 701 in the embodiment of FIG. 7 described above.

In block 1402, a data attribute of the first sidelink data is determined.

As an example, the data attribute of the first sidelink data may include a Quality of Service (QoS) attribute of the first sidelink data. Further, the QoS attribute may include, but is not limited to, one or more of a priority, a delay, reliability, and a transmission speed.

That is, the receiving device obtains the data attribute of the first sidelink data, such that it can be determined, based on the data attribute of the first sidelink data, which sidelink feedback channel format is used to transmit the feedback information.

In block 1403, the target sidelink feedback channel format is determined based on the data attribute of the first sidelink data and a correspondence between data attributes and sidelink feedback channel formats.

The correspondence between the data attributes and the sidelink feedback channel formats may be configured by the network or pre-configured. For example, if the data attribute is the priority in the QoS attribute, the correspondence can be configured in such a manner that: the first sidelink feedback channel format is used to transmit the feedback information for sidelink data with a priority level lower than P, and the second sidelink feedback channel format is used to transmit the feedback information for sidelink data with a priority level larger than or equal to P. As an example, a lower priority level represents a higher priority. P can be set based on practical needs.

In this embodiment of the present disclosure, the receiving device is configured to receive the first sidelink data, and determine the data attribute of the first sidelink data. For example, the priority information of the first sidelink data can be obtained from the SCI, such that the target sidelink feedback channel format for transmitting the feedback information for the first sidelink data can be determined based on the data attribute of the first sidelink data and the correspondence between the data attributes and the sidelink feedback channel formats.

Figure 15:
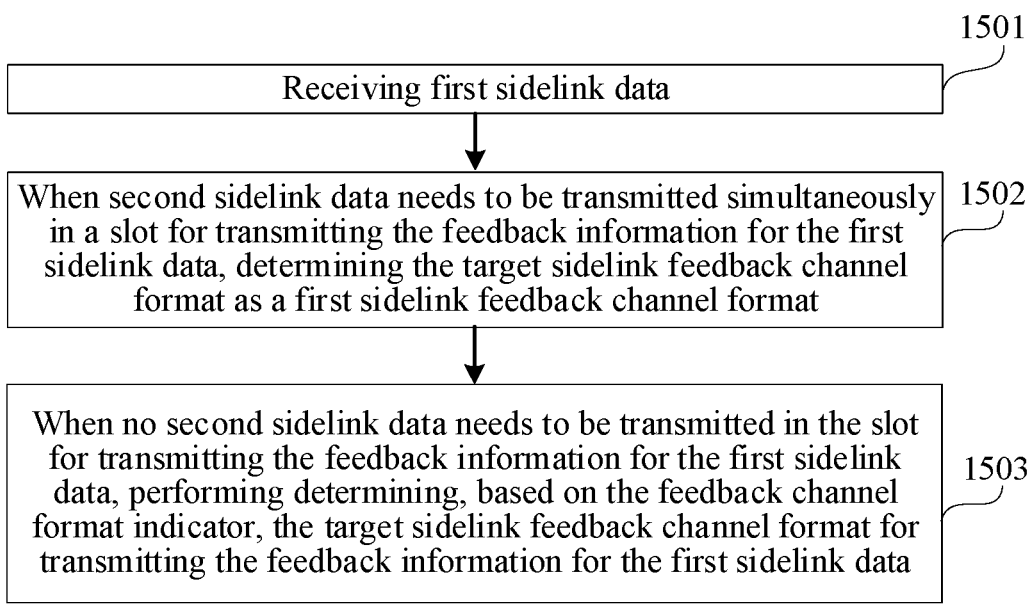
FIG. 15 is a flowchart illustrating a method for determining a sidelink feedback channel according to still yet another exemplary embodiment of the present disclosure.

FIG. 15 is a flowchart illustrating a method for determining a sidelink feedback channel according to still yet another exemplary embodiment. Referring to FIG. 15, the method can be applied to each of the implementation environments illustrated in FIG. 6, and can be implemented by the receiving device serving as the main execution body. The method can include the following implementation operations.

In block 1501, first sidelink data is received.

For a specific implementation of the operation at block 1501, reference may be made to block 701 in the embodiment of FIG. 7 described above.

In block 1502, when second sidelink data needs to be transmitted simultaneously in a slot for transmitting the feedback information for the first sidelink data, the target sidelink feedback channel format is determined as a first sidelink feedback channel format.

As an example, it can be determined whether the first sidelink feedback channel format needs to be adopted, based on whether there is second sidelink data to be additionally transmitted within a time range of the sidelink feedback channel for transmitting the feedback information. Specifically, since the second format of sidelink feedback channel occupies one slot, when the second sidelink data needs to be transmitted simultaneously in the slot for transmitting the feedback information for the first sidelink data, only the first sidelink feedback channel format can be adopted. For example, if the first sidelink data is received in slot n, the feedback information needs to be transmitted in slot n+2. If the terminal needs to transmit the second sidelink data in this slot simultaneously, e.g., transmitting the second sidelink data in a broadcast manner, only the first sidelink feedback channel format can be used. That is, the target sidelink feedback channel format is determined as the first sidelink feedback channel format.

Figure 16:
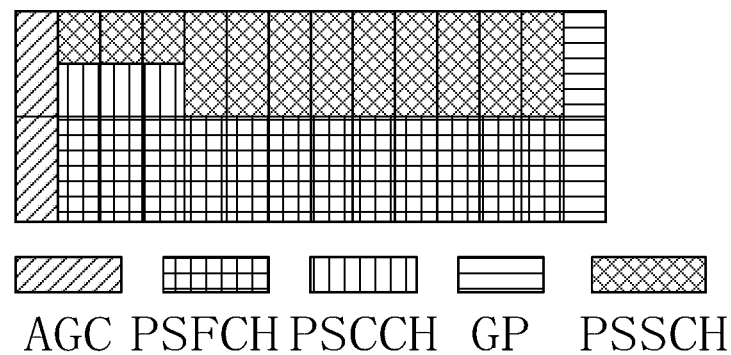
FIG. 16 is a schematic diagram showing a slot for data transmission according to an exemplary embodiment.
Figure 17:
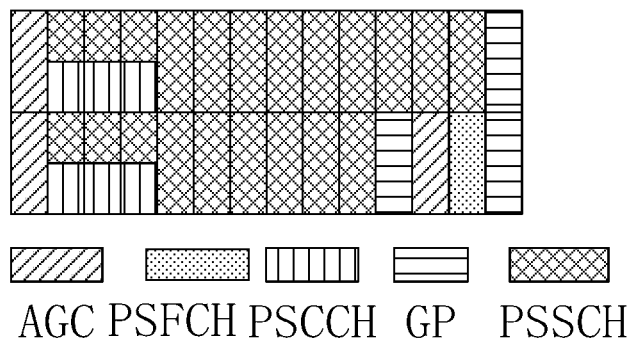
FIG. 17 is a schematic diagram showing a slot for data transmission according to an exemplary embodiment.

For example, referring to FIG. 16 and FIG. 17, since the receiving device also needs to transmit the second sidelink data in the slot for transmitting the feedback information, the feedback information cannot be transmitted through the second sidelink feedback channel format in the manner illustrated in FIG. 16, and the feedback information can only be transmitted through the first sidelink feedback channel format in the manner illustrated in FIG. 17.

In block 1503, when no second sidelink data needs to be transmitted in the slot for transmitting the feedback information for the first sidelink data, the target sidelink feedback channel format for transmitting the feedback information for the first sidelink data is determined based on the feedback channel format indicator.

When no second sidelink data needs to be transmitted in the slot for transmitting the feedback information for the first sidelink data, the target sidelink feedback channel format can be determined in the manners provided in the above embodiments, and details thereof will be omitted here.

In this embodiment of the present disclosure, before determining the target sidelink feedback channel format based on the feedback channel format indicator, it is also determined whether the second sidelink data needs to be transmitted in the slot for transmitting the feedback information for the first sidelink data. When it is determined that the second sidelink data needs to be transmitted, it indicates that the second sidelink feedback channel format cannot be used for this slot, thereby improving a success rate of data transmission.

Figure 18:
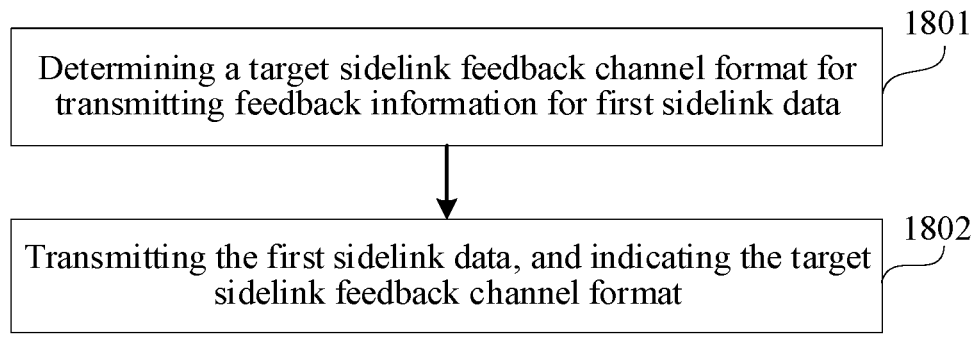
FIG. 18 is a flowchart illustrating a method for determining a sidelink feedback channel according to still yet another exemplary embodiment of the present disclosure.

FIG. 18 is a flowchart illustrating a method for determining a sidelink feedback channel according to still yet another exemplary embodiment. Referring to FIG. 18, the method can be applied to each of the implementation environments illustrated in FIG. 6, and can be implemented by the transmitting device serving as the main execution body. The method can include the following implementation operations.

In block 1801, a target sidelink feedback channel format for transmitting feedback information for first sidelink data is determined.

As an example, the transmitting device may determine which target sidelink feedback channel format the receiving device uses to transmit the feedback information. In practice, the transmitting device can determine the target sidelink feedback channel format through the following implementations.

Implementation 1: a logical channel from which the first sidelink data comes is determined, and the target sidelink feedback channel format is determined based on the logical channel from which the first sidelink data comes and a correspondence between logical channels and sidelink feedback channel formats.

The correspondence between the logical channels and the sidelink feedback channel formats may be configured by the network or pre-configured. As an example, different logical channels may correspond to one sidelink feedback channel format. That is, different logical channels may correspond to the same sidelink feedback channel format.

The first sidelink data transmitted by the transmitting device to the receiving device may come from different logical channels. The transmitting device can determine which sidelink feedback channel format can be adopted, based on the logical channel from which the first sidelink data comes and the correspondence between the logical channels and the sidelink feedback channel formats.

Implementation 2: a data attribute of the first sidelink data is determined, and the target sidelink feedback channel format is determined based on the data attribute of the first sidelink data and a correspondence between data attributes and sidelink feedback channel formats.

As an example, the data attribute of the first sidelink data may include the QoS attribute of the first sidelink data.

For the specific implementation principle, reference may be made to the implementation principle for the receiving device to determine the target sidelink feedback channel format based on the data attribute of the first sidelink data, and details thereof will be omitted here.

Implementation 3: third indication information is obtained. The third indication information is configured through RRC signaling, or the third indication information is configured through the RRC signaling or Downlink Control Information (DCI) signaling. The target sidelink feedback channel format is determined based on the third indication information.

As an example, the network can allocate, for a sidelink transmission, transmission resources for a sidelink configuration grant. The sidelink configuration grant can include two modes: type1 and type2. Type1 is configured through the RRC signaling, and type2 is configured through the RRC signaling and the DCI signaling. When type1 configuration grant is adopted, the third indication information can be included in the RRC signaling to indicate the sidelink feedback channel format to be used. When type2 configuration grant is adopted, the third indication information can be carried in the RRC configuration signaling or in the DCI signaling to indicate the sidelink feedback channel format to be used.

For example, when the third indication information is configured through the DCI signaling, the network indicates the sidelink feedback channel format through the DCI signaling while dynamically allocating the transmission resources, such that the transmitting device determines the sidelink feedback channel format based on the third indication information in the DCI signaling.

Implementation 4: fourth indication information is obtained. The fourth indication information is configured in resource pool configuration information. The target sidelink feedback channel format is determined based on the fourth indication information.

For the specific implementation principle, reference may be made to the implementation principle for the receiving device to determine the target sidelink feedback channel format based on the second indication information, and details thereof will be omitted here.

Implementation 5: a slot gap between the sidelink feedback channel and a data transmission channel of the first sidelink data is determined; and the target sidelink feedback channel format is determined based on the slot gap.

As an example, an implementation of determining the target sidelink feedback channel format based on the slot gap may specifically include: determining the target sidelink feedback channel format as a first sidelink feedback channel format when the slot gap is smaller than a slot threshold; and determining the target sidelink feedback channel format as a second sidelink feedback channel format when the slot gap is larger than or equal to the slot threshold. A number of time domain symbols occupied by the first sidelink feedback channel format is smaller than a number of time domain symbols occupied by the second sidelink feedback channel format.

For the specific implementation principle, reference can be made to the implementation principle for the receiving device to determine the target sidelink feedback channel format based on the slot gap, and details thereof will be omitted here.

In block 1802, the first sidelink data is transmitted, and the target sidelink feedback channel format is indicated.

As an example, the transmitting device may indicate the target sidelink feedback channel format in at least one of the following modes.

Implementation 1: the target sidelink feedback channel format is indicated by first indicator carried in a target information field of SCI.

Implementation 2: the target sidelink feedback channel format is indicated by an RNTI used in scrambling or mask processing.

Implementation 3: the target sidelink feedback channel format is indicated by a format adopted by a PSCCH.

The format adopted by the PSCCH is represented by at least one of a number of time domain symbols occupied by the PSCCH, a size of a frequency domain resource occupied by the PSCCH, an aggregation level of the PSCCH, and a format of the SCI.

It should be noted that, for specific implementation principles of the above three implementations, reference may be made to the implementation principle for the receiving device to determine the target sidelink feedback channel format in corresponding manners in the above embodiments.

In this embodiment of the present disclosure, the target sidelink feedback channel format for transmitting the feedback information for the first sidelink data can be determined. With the first sidelink data transmitted from the transmitting device and the target sidelink feedback channel format indicated by the transmitting device, the receiving device can transmit the feedback information through the target sidelink feedback channel based on the indication.

It should be noted that the method for determining the sidelink feedback channel according to each of the above embodiments is also applicable to determining a feedback mode of the feedback information in multicast communication. Currently, the following two feedback modes are provided for the multicast communication.

Mode 1: only the HARQ NACK is fed back. That is, only when a position of the receiving device and a position of the transmitting device are within a certain distance range and the receiving device fails to receive the PSSCH correctly (i.e., the HARQ NACK needs to be fed back), can the feedback information be transmitted. Further, each receiving device that needs to transmit the HARQ NACK uses the same transmission resource to transmit the feedback information.

Mode 2: the HARQ ACK or the HARQ NACK is fed back. If the receiving device in a group receives the PSSCH correctly, the HARQ ACK is transmitted. If the receiving device fails to receive the PSSCH correctly, the HARQ NACK is transmitted. Different receiving devices use different transmission resources to transmit the feedback information. Different transmission resources include different time domain resources, frequency domain resources, or code domain resources.

In an implementation, when the receiving device needs to perform feedback, it is necessary to determine which feedback mode is used to transmit the feedback information. In this embodiment of the present disclosure, the feedback mode of the feedback information can be determined in the manners provided in the above embodiments. For example, for the receiving device, the feedback mode of the feedback information may be determined based on the first indicator in the target information field of the SCI; or the feedback mode of the feedback information may be determined based on the RNTI; or the feedback mode of the feedback information may be determined based on the format adopted by the PSCCH; or the feedback mode of the feedback information may be determined based on the data attribute of the first sidelink data; or the feedback mode of the feedback information may be determined based on the slot gap between the sidelink feedback channel and the data transmission channel of the first sidelink data; or the feedback mode of the feedback information may be determined based on the second indication information in the RRC signaling.

Further, for the transmitting device, the feedback mode of the feedback information can be determined in at least one of the following manners of: determining the feedback mode of the feedback information based on the logical channel from which the first sidelink data comes; determining the feedback mode of the feedback information based on the data attribute of the first sidelink data; determining the feedback mode of the feedback information based on the third indication information; and determining the feedback mode of the feedback information based on the fourth indication information in the resource pool configuration information. The third indication information is included in configuration signaling by which the network allocates transmission resources for a sidelink configuration grant to the transmitting device. Reference may be made to the above description for specific implementation.

Figure 19:
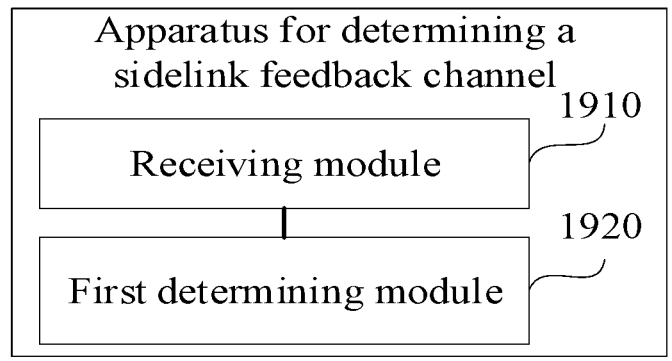
FIG. 19 is a schematic block diagram of an apparatus for determining a sidelink feedback channel according to an exemplary embodiment of the present disclosure.

FIG. 19 is a schematic block diagram of an apparatus for determining a sidelink feedback channel according to an exemplary embodiment. Referring to FIG. 19, the apparatus can be applied in the receiving device. The apparatus can include a receiving module 1910 and a first determining module 1920.

The receiving module 1910 is configured to receive first sidelink data.

The first determining module 1920 is configured to determine, based on a feedback channel format indicator, a target sidelink feedback channel format for transmitting feedback information for the first sidelink data.

In a possible implementation of the present disclosure, the first determining module 1920 is configured to: obtain SCI carried in a PSCCH; and determine the target sidelink feedback channel format based on first indicator carried in a target information field of the SCI.

In a possible implementation of the present disclosure, the first determining module 1920 is configured to: perform descrambling or de-mask processing on SCI by using a first RNTI and a second RNTI respectively, to obtain a first processing result and a second processing result; and determine the target sidelink feedback channel format based on the first processing result, the second processing result, and a correspondence between RNTIs and sidelink feedback channel formats.

In a possible implementation of the present disclosure, the first determining module 1920 is configured to: determine a format adopted by a PSCCH, the format adopted by the PSCCH being represented by at least one of a number of time domain symbols occupied by the PSCCH, a size of a frequency domain resource occupied by the PSCCH, an aggregation level of the PSCCH, and a format of SCI; and determine the target sidelink feedback channel format based on the format adopted by the PSCCH and a correspondence between formats of the PSCCH and sidelink feedback channel formats.

In a possible implementation of the present disclosure, the first determining module 1920 is configured to: determine a slot gap between the sidelink feedback channel and a data transmission channel of the first sidelink data; and determine the target sidelink feedback channel format based on the slot gap.

In a possible implementation of the present disclosure, the first determining module 1920 is configured to: determine the target sidelink feedback channel format as a first sidelink feedback channel format when the slot gap is smaller than a slot threshold; and determine the target sidelink feedback channel format as a second sidelink feedback channel format when the slot gap is larger than or equal to the slot threshold. A number of time domain symbols occupied by the first sidelink feedback channel format is smaller than a number of time domain symbols occupied by the second sidelink feedback channel format.

In a possible implementation of the present disclosure, the first determining module 1920 is configured to: obtain second indication information in received RRC signaling; and determine a sidelink feedback channel format indicated by the second indication information as the target sidelink feedback channel format.

In a possible implementation of the present disclosure, the RRC signaling is used to configure a PSSCH resource pool or a PSFCH resource pool.

In a possible implementation of the present disclosure, the first determining module 1920 is configured to: determine a data attribute of the first sidelink data; and determine the target sidelink feedback channel format based on the data attribute of the first sidelink data and a correspondence between data attributes and sidelink feedback channel formats.

In a possible implementation of the present disclosure, the data attribute of the first sidelink data includes a QoS attribute of the first sidelink data.

In a possible implementation of the present disclosure, the first determining module 1920 is configured to: when second sidelink data needs to be transmitted simultaneously in a slot for transmitting the feedback information for the first sidelink data, determine the target sidelink feedback channel format as a first sidelink feedback channel format; and when no second sidelink data needs to be transmitted in the slot for transmitting the feedback information for the first sidelink data, perform determining, based on the feedback channel format indicator, the target sidelink feedback channel format for transmitting the feedback information for the first sidelink data.

In this embodiment of the present disclosure, the receiving device is configured to receive the first sidelink data, and determine, based on the feedback channel format indicator, the target sidelink feedback channel format for transmitting the feedback information for the first sidelink data. In this way, the receiving device can transmit the feedback information through the determined target sidelink feedback channel.

Figure 20:
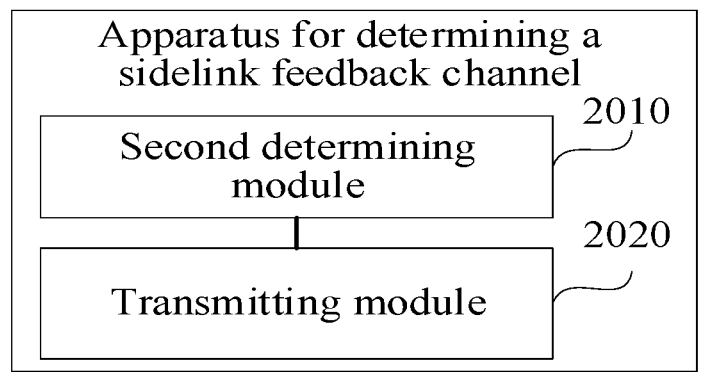
FIG. 20 is a schematic block diagram of an apparatus for determining a sidelink feedback channel according to another exemplary embodiment of the present disclosure.

FIG. 20 is a schematic block diagram of an apparatus for determining a sidelink feedback channel according to an exemplary embodiment. Referring to FIG. 20, the apparatus can be applied in the transmitting device. The apparatus can include a second determining module 2010 and a transmitting module 2020.

The second determining module 2010 is configured to determine a target sidelink feedback channel format for transmitting feedback information for first sidelink data.

The transmitting module 2020 is configured to transmit the first sidelink data, and indicate the target sidelink feedback channel format.

In a possible implementation of the present disclosure, the second determining module 2010 is configured to: determine a logical channel from which the first sidelink data comes; and determine the target sidelink feedback channel format based on the logical channel from which the first sidelink data comes and a correspondence between logical channels and sidelink feedback channel formats.

In a possible implementation of the present disclosure, the second determining module 2010 is configured to: determine a data attribute of the first sidelink data; and determine the target sidelink feedback channel format based on the data attribute of the first sidelink data and a correspondence between data attributes and sidelink feedback channel formats.

In a possible implementation of the present disclosure, the data attribute of the first sidelink data includes a QoS attribute of the first sidelink data.

In a possible implementation of the present disclosure, the second determining module 2010 is configured to: obtain third indication information, which is configured through RRC signaling, or is configured through the RRC signaling or DCI signaling; and determine the target sidelink feedback channel format based on the third indication information.

In a possible implementation of the present disclosure, the second determining module 2010 is configured to: obtain fourth indication information, which is configured in resource pool configuration information; and determine the target sidelink feedback channel format based on the fourth indication information.

In a possible implementation of the present disclosure, the transmitting module 2020 is configured to perform indication by any one or more of the following modes of: indicating the target sidelink feedback channel format by first indicator carried in a target information field of SCI; or indicating the target sidelink feedback channel format by a RNTI used in scrambling or mask processing; or indicating the target sidelink feedback channel format by a format adopted by a PSCCH. The format adopted by the PSCCH is represented by at least one of a number of time domain symbols occupied by the PSCCH, a size of a frequency domain resource occupied by the PSCCH, an aggregation level of the PSCCH, and a format of the SCI.

In a possible implementation of the present disclosure, the second determining module 2010 is configured to: determine a slot gap between the sidelink feedback channel and a data transmission channel of the first sidelink data; and determine the target sidelink feedback channel format based on the slot gap.

In a possible implementation of the present disclosure, the second determining module 2010 is configured to: determine the target sidelink feedback channel format as a first sidelink feedback channel format when the slot gap is smaller than a slot threshold; and determine the target sidelink feedback channel format as a second sidelink feedback channel format when the slot gap is larger than or equal to the slot threshold. A number of time domain symbols occupied by the first sidelink feedback channel format is smaller than a number of time domain symbols occupied by the second sidelink feedback channel format.

In this embodiment of the present disclosure, the target sidelink feedback channel format for transmitting the feedback information for the first sidelink data can be determined. With the first sidelink data transmitted from the transmitting device and the target sidelink feedback channel format indicated by the transmitting device, the receiving device can transmit the feedback information through the target sidelink feedback channel based on the indication.

Figure 21:
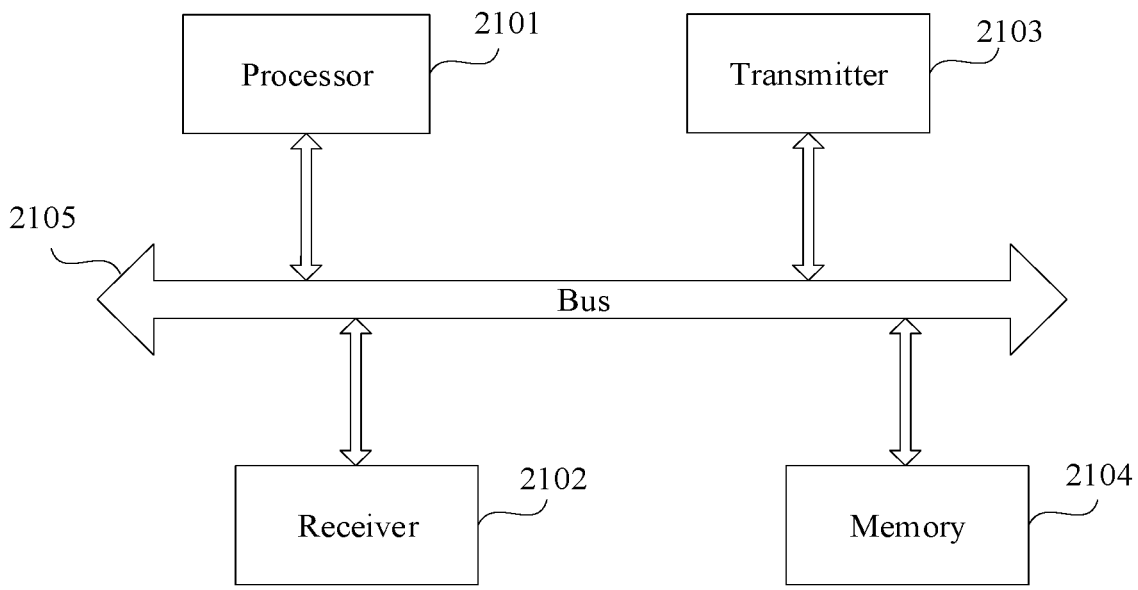
FIG. 21 is a schematic block diagram of a device according to an exemplary embodiment of the present disclosure.

FIG. 21 is a schematic block diagram of a device according to an exemplary embodiment of the present disclosure. The device can be the receiving device described above, or alternatively, the transmitting device described above. The device includes a processor 2101, a receiver 2102, a transmitter 2103, a memory 2104, and a bus 2105.

The processor 2101 includes one or more processing cores. The processor 2101 executes various functional applications and information processing by running software programs and modules.

The receiver 2102 and the transmitter 2103 can be implemented as one communication component. The communication component can be a communication chip.

The memory 2104 is connected to the processor 2101 through the bus 2105.

The memory 2104 can be used to store at least one instruction. The processor 2101 is configured to execute the at least one instruction, so as to implement each operation executed by the device in the above method embodiments.

In addition, the memory 2104 may be implemented by any type of volatile or non-volatile storage device or a combination thereof. The volatile or non-volatile storage device includes, but is not limited to a magnetic disk or an optical disc, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, a Programmable Read-Only Memory (PROM).

The present disclosure provides a computer-readable storage medium. At least one instruction is stored on the storage medium. The at least one instruction is loaded and executed by the processor to implement the method according to the method embodiments described above.

The present disclosure also provides a computer program product. When the computer program product runs on the computer, the computer is caused to execute the method according to the method embodiments described above.

A person skilled in the art can understand that all or a part of the operations in the above embodiments can be implemented by hardware, or by relevant hardware instructed by a program. The program can be stored in a computer-readable storage medium. The above storage medium may be a read-only memory, a magnetic disk or an optical disc, etc.

The above are only preferred embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A method for determining a sidelink feedback channel, applied in a receiving device, the method comprising:
    receiving first sidelink data; and
    determining, based on a feedback channel format indicator, a target sidelink feedback channel format for transmitting feedback information for the first sidelink data, the method further comprising:
    when second sidelink data needs to be transmitted simultaneously in a slot for transmitting the feedback information for the first sidelink data, determining the target sidelink feedback channel as a first sidelink feedback channel format; and
    when no second sidelink data needs to be transmitted in the slot for transmitting the feedback information for the first sidelink data, performing said determining, based on the feedback channel format indicator, the target sidelink feedback channel format for transmitting the feedback information for the first sidelink data.

2. The method according to claim 1, wherein said determining, based on the feedback channel format indicator, the target sidelink feedback channel format for transmitting the feedback information for the first sidelink data comprises:
    obtaining Sidelink Control Information (SCI) carried in a Physical Sidelink Control Channel (PSCCH); and
    determining the target sidelink feedback channel format based on first indicator carried in a target information field of the SCI.

3. The method according to claim 1, wherein said determining, based on the feedback channel format indicator, the target sidelink feedback channel format for transmitting the feedback information for the first sidelink data comprises:
    determining a format adopted by a Physical Sidelink Control Channel (PSCCH), wherein the format adopted by the PSCCH is represented by at least one of a number of time domain symbols occupied by the PSCCH, a size of a frequency domain resource occupied by the PSCCH, an aggregation level of the PSCCH, and a format of Sidelink Control Information (SCI); and
    determining the target sidelink feedback channel format based on the format adopted by the PSCCH and a correspondence between formats of the PSCCH and sidelink feedback channel formats.

4. The method according to claim 1, wherein said determining, based on the feedback channel format indicator, the target sidelink feedback channel format for transmitting the feedback information for the first sidelink data comprises:
    obtaining second indication information in received Radio Resource Control (RRC) signaling; and
    determining a sidelink feedback channel format indicated by the second indication information as the target sidelink feedback channel format.

5. The method according to claim 4, wherein the RRC signaling is used to configure a Physical Sidelink Shared Channel (PSSCH) resource pool or a Physical Sidelink Feedback Channel (PSFCH) resource pool.

6. The method according to claim 1, wherein said determining, based on the feedback channel format indicator, the target sidelink feedback channel format for transmitting the feedback information for the first sidelink data comprises:
    determining a data attribute of the first sidelink data; and
    determining the target sidelink feedback channel format based on the data attribute of the first sidelink data and a correspondence between data attributes and sidelink feedback channel formats.

7. The method according to claim 6, wherein the data attribute of the first sidelink data comprises a Quality of Service (QOS) attribute of the first sidelink data.

8. A method for determining a sidelink feedback channel, applied in a transmitting device, the method comprising:
    determining a target sidelink feedback channel format for transmitting feedback information for first sidelink data; and
    transmitting the first sidelink data to a receiving device, and indicating the target sidelink feedback channel format to the receiving device via a feedback channel format indicator,
    wherein the receiving device is configured to
    when second sidelink data needs to be transmitted simultaneously in a slot for transmitting the feedback information for the first sidelink data, determine a target sidelink feedback channel for transmitting the feedback information for the first sidelink data as a first sidelink feedback channel format; and
    when no second sidelink data needs to be transmitted in the slot for transmitting the feedback information for the first sidelink data, determine, based on the feedback channel format indicator, the target sidelink feedback channel format for transmitting the feedback information for the first sidelink data.

9. The method according to claim 8, wherein said determining the target sidelink feedback channel format for transmitting the feedback information for the first sidelink data comprises:
    determining a logical channel from which the first sidelink data comes; and
    determining the target sidelink feedback channel format based on the logical channel from which the first sidelink data comes and a correspondence between logical channels and sidelink feedback channel formats.

10. The method according to claim 8, wherein said determining the target sidelink feedback channel format for transmitting the feedback information for the first sidelink data comprises:
determining a data attribute of the first sidelink data; and
determining the target sidelink feedback channel format based on the data attribute of the first sidelink data and a correspondence between data attributes and sidelink feedback channel formats.

11. The method according to claim 10, wherein the data attribute of the first sidelink data comprises a Quality of Service (QOS) attribute of the first sidelink data.

12. The method according to claim 8, wherein said determining the target sidelink feedback channel format for transmitting the feedback information for the first sidelink data comprises:
obtaining third indication information, wherein the third indication information is configured through Radio Resource Control (RRC) signaling or Downlink Control Information (DCI) signaling; and
determining the target sidelink feedback channel format based on the third indication information.

13. The method according to claim 8, wherein said determining the target sidelink feedback channel format for transmitting the feedback information for the first sidelink data comprises:
obtaining fourth indication information, wherein the fourth indication information is configured in resource pool configuration information; and
determining the target sidelink feedback channel format based on the fourth indication information.

14. The method according to claim 9, wherein the target sidelink feedback channel format is indicated by any one or more of the following modes of:
indicating the target sidelink feedback channel format by first indicator carried in a target information field of Sidelink Control Information (SCI); or
indicating the target sidelink feedback channel format by a Radio Network Temporary Identity (RNTI) used in scrambling or mask processing; or
indicating the target sidelink feedback channel format by a format adopted by a Physical Sidelink Control Channel (PSCCH),
wherein the format adopted by the PSCCH is represented by at least one of a number of time domain symbols occupied by the PSCCH, a size of a frequency domain resource occupied by the PSCCH, an aggregation level of the PSCCH, and a format of the SCI.

15. An apparatus for determining a sidelink feedback channel, applied in a receiving device, the apparatus comprising a processor and a memory, wherein the memory has at least one instruction stored thereon, and the at least one instruction is executed by the processor to implement operations comprising:
receiving first sidelink data; and
determining, based on a feedback channel format indicator, a target sidelink feedback channel format for transmitting feedback information for the first sidelink data, the operations further comprising:
when second sidelink data needs to be transmitted simultaneously in a slot for transmitting the feedback information for the first sidelink data, determining the target sidelink feedback channel as a first sidelink feedback channel format; and
when no second sidelink data needs to be transmitted in the slot for transmitting the feedback information for the first sidelink data, performing said determining, based on the feedback channel format indicator, the target sidelink feedback channel format for transmitting the feedback information for the first sidelink data.

16. The apparatus according to claim 15, wherein said determining, based on the feedback channel format indicator, the target sidelink feedback channel format for transmitting the feedback information for the first sidelink data comprises:
obtaining Sidelink Control Information (SCI) carried in a Physical Sidelink Control Channel (PSCCH); and
determining the target sidelink feedback channel format based on first indicator carried in a target information field of the SCI.

17. The apparatus according to claim 15, wherein said determining, based on the feedback channel format indicator, the target sidelink feedback channel format for transmitting the feedback information for the first sidelink data comprises:
determining a format adopted by a Physical Sidelink Control Channel (PSCCH), wherein the format adopted by the PSCCH is represented by at least one of a number of time domain symbols occupied by the PSCCH, a size of a frequency domain resource occupied by the PSCCH, an aggregation level of the PSCCH, and a format of Sidelink Control Information (SCI); and
determining the target sidelink feedback channel format based on the format adopted by the PSCCH and a correspondence between formats of the PSCCH and sidelink feedback channel formats.

18. The apparatus according to claim 15, wherein said determining, based on the feedback channel format indicator, the target sidelink feedback channel format for transmitting the feedback information for the first sidelink data comprises:
obtaining second indication information in received Radio Resource Control (RRC) signaling; and
determining a sidelink feedback channel format indicated by the second indication information as the target sidelink feedback channel format.

19. The apparatus according to claim 15, wherein said determining, based on the feedback channel format indicator, the target sidelink feedback channel format for transmitting the feedback information for the first sidelink data comprises:
determining a data attribute of the first sidelink data; and
determining the target sidelink feedback channel format based on the data attribute of the first sidelink data and a correspondence between data attributes and sidelink feedback channel formats.

* * * * *